May 16, 1939. J. J. FOWLER 2,158,752
COTTON DRYING AND CONDITIONING APPARATUS
Filed Sept. 5, 1936    3 Sheets-Sheet 1

Inventor
Jesse J. Fowler
By Cushman, Derby & Cushman
Attorneys

Patented May 16, 1939

2,158,752

UNITED STATES PATENT OFFICE 2,158,752

COTTON DRYING AND CONDITIONING APPARATUS

Jesse J. Fowler, Eudora, Ark.

Application September 5, 1936, Serial No. 99,667

6 Claims. (Cl. 19—66)

This invention relates to a cotton treating apparatus and refers particularly to an apparatus for both drying and conditioning cotton before it is delivered to the gin.

An object of the invention is to first completely dry the cotton and then moisten it so that all of the cotton will be uniformly conditioned prior to its delivery to the gin.

A further object is the provision of a cotton treating apparatus which may be installed as a unit in the usual delivery system for conveying cotton to the gin.

With the foregoing and other objects in view, the invention will be more particularly described, reference being had to the accompanying drawings, in which:

Figure 5 is a detail of the preferred form of the joint between one of the branch fluid distributing pipes and a screw shaft.

Figure 6 shows a modification of the joint illustrated in Figure 5, and

Figure 1:
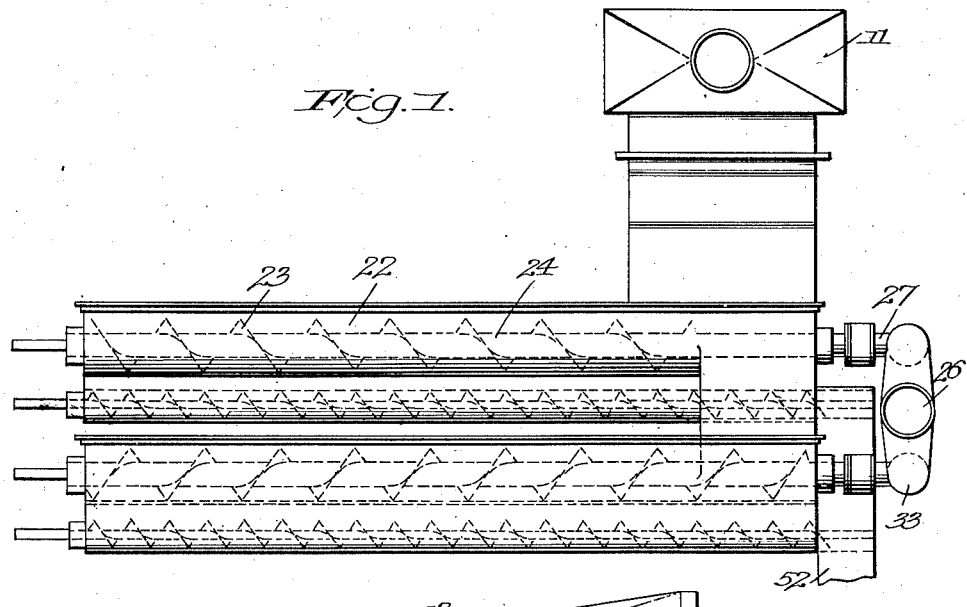
Figure 1 is a top plan view of my cotton drying and conditioning apparatus.

Referring to the drawings, my invention comprises a cotton drying and conditioning apparatus 10 designed to be incorporated as a unit in the usual cotton feeding system for delivering seed cotton to the gins. This system comprises an inlet 11 into which the cotton is delivered from the trucks or wagons as it is taken from the field. The cotton is drawn by suitable suction means into an air seal dropper or separator 12, then through a separator 13, which discharges the cotton into a chute 14 which houses a flap valve 15. In the event that the cotton is sufficiently dried or conditioned to be operated upon by the gins, the valve may be positioned to permit the cotton to immediately pass through the passage 16 to the distributor conveyor 17 which distributes the cotton to a battery of gins 18 in the usual manner. In some instances the moisture content of the cotton is too great to permit the cotton to be conveyed directly to the gins and it is necessary to dry the cotton prior to its entry thereto.

I have found that in most instances the moisture content of the cotton is not uniform and that if it is merely passed through the usual type of drier, some of the cotton will be in the desired condition but a great quantity will be either too wet or too dry for proper ginning. My apparatus is designed to take care of this deficiency and I accomplish this by first subjecting the cotton to a complete drying action which removes substantially all of the moisture from the cotton regardless of the initial moisture content thereof. The cotton in this condition is, however, too dry to be acted upon by the gins, and I therefore temper or condition the cotton by adding a slight degree of moisture to the same just before it passes to the gins.

One form of my invention for accomplishing this drying and conditioning operation comprises that shown in Figures 1 through 4, and includes a battery 19 of screw conveyors. These conveyors, while they may be of any desired number, in the present instance comprise upper and lower tiers 20 and 21, with four conveyors to each tier. The conveyors are arranged to move the cotton first in one direction through one conveyor where it is discharged into the next adjacent conveyor. This conveyor moves the cotton in the opposite direction where it is then transferred to the next adjacent conveyor, and so on throughout the whole battery whereby the cotton is sufficiently dried and conditioned.

Each conveyor unit comprises a trough 22 which completely encloses the screw 23. Each screw is provided with a hollow shaft 24 and this shaft is perforated intermediate the turns of the screw as at 25 so as to form a continuous set of spiral perforations extending substantially from one end of the screw to the other.

The cotton as it travels through the conveyors is first subjected to the action of heated air for thoroughly drying the same. This air is supplied to the conveyors in any suitable manner. In these views I have shown a hot air delivery pipe 26 having branches 27 leading to each conveyor shaft 24. The air before it is delivered to the pipe 26 may be heated in any suitable manner, and after it enters the shafts 24 it escapes through the perforations 25 and passes into intimate contact with the cotton. It will be observed that the perforations extend entirely to the discharge end of each conveyor and as shown in Figure 3, the perforations at this end are in a straight line as at 28 so that the escaping air may assist the flipper 29 in transferring the cotton to the next adjacent screw.

It will further be observed that that portion of the next adjacent screw is imperforate as at 30 and that the perforations begin at a point beyond where the cotton is delivered. This is for the purpose of further assisting in the transfer of the cotton from one conveyor to the other. If the perforations were extended entirely to the delivery end of each conveyor, the escaping air would retard rather than assist in the transfer of the cotton.

Figure 3:
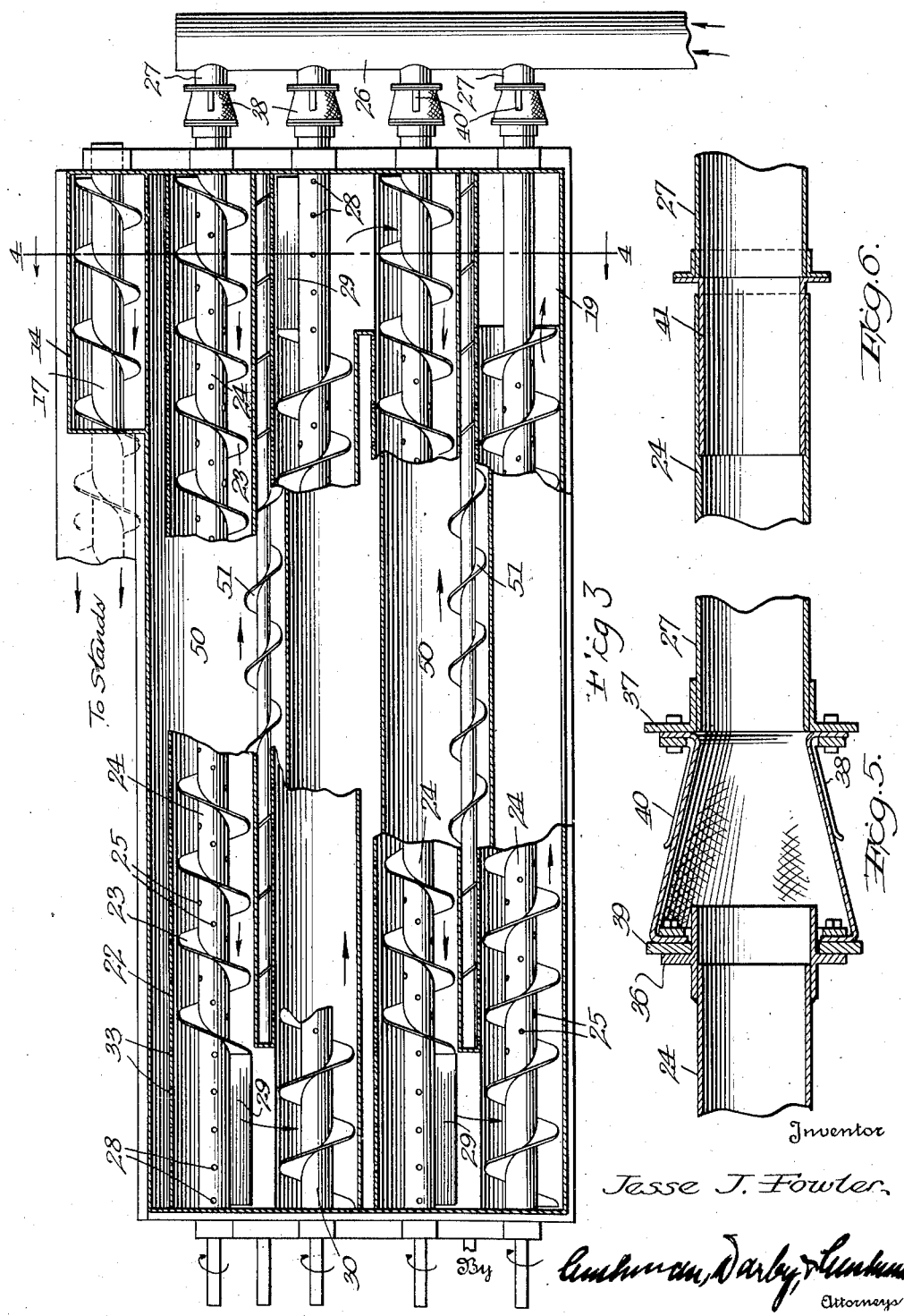
Figure 3 is a top plan view partly in section of the top tier of a battery of screw conveyors.
Figure 4:
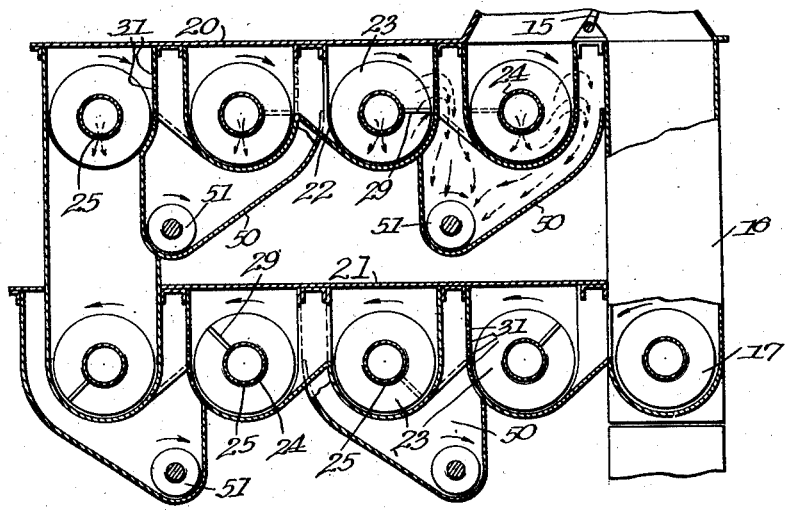
Figure 4 is a vertical transverse section through the battery of conveyors.

While any suitable means may be utilized for permitting the hot air to escape from the several troughs, I have shown in Figures 3 and 4 a series of perforations 31 at the side of each trough opposite the carrying side of the screw. By the carrying side I means that side of the screw which tends to pack the material in the bottom of the trough as it is conveyed by the screw, and I therefore place the perforations 31 at the side opposite to the carrying side in order that the heated air may have an opportunity to pass through the compacted material before it escapes from the troughs.

Figure 2:
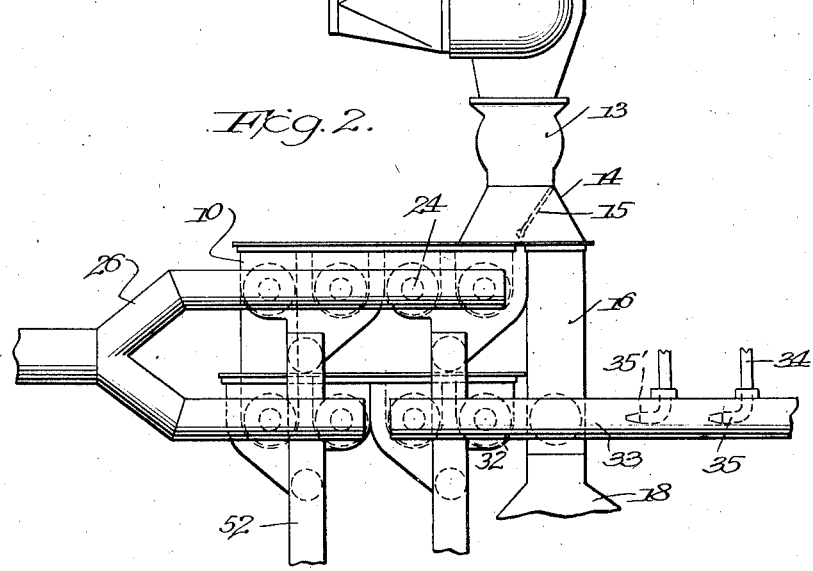
Figure 2 is an end elevation thereof.

Referring now to Figures 1 and 2, it will be observed that the heated air passes through all of the top tier of the conveyors and two conveyors of the lower tier. These conveyors may, of course, be added to or decreased as desired, but I have found this number to be sufficient to remove substantially all of the moisture from the cotton. The cotton in this dry state is in fact too dry to be efficiently acted upon the by the gins. I therefore provide means in the last two conveyors 32 for adding a slight amount of moisture to the cotton before it is discharged to the gins. This means may take the form of moistened or steam ladened air, and in the present instance the shafts of the conveyors 32 communicate with a pipe 33 which may be open to the atmosphere. Steam pipes 34 project through the pipe 33 and terminate in injector nozzles 35 which function to draw the air into the pipes 33 and inject it through the perforated shafts of the conveyors in a manner sufficient to moisten the cotton and condition it for the ginning operation.

In addition to treating the dry cotton with steam ladened or moistened air, I prefer also to introduce a small amount of cotton-seed oil to the conditioning conveyors 32. I have found that by adding a slight amount of this oil to the moistened air, the conditioning of the cotton for the ginning operation is greatly facilitated. This cotton-seed oil may be added to the cotton in any suitable manner, although I prefer to introduce it in the form of a jet or spray to the pipe 33, through an injector nozzle 35' positioned in advance of the nozzle 35, whereby the oil will be mixed with the moistened air and conveyed to the cotton in the air stream. Any suitable means (not shown) may be utilized to store and convey the cotton-seed oil under pressure to the nozzle 35'.

In Figure 5 of the drawings there is disclosed the preferred form of fluid-tight connection between the stationary branch pipes 27 and the hollow rotating shafts 24. This comprises a ring 36 rigidly connected to each shaft 24 and adapted to rotate therewith. A second ring 37 is rigidly connected to the end of the branch pipe 27 and has secured thereto one end of a flexible boot 38. This boot may be of canvas or any other material which will prevent leakage of air or steam therethrough. The free end of the boot is connected to a third ring 39 and in normal operation of the device this ring is adapted to abut against the rotating ring 36 in fluid-tight relation thereto. The ring 39 is retained in this fluid-tight position by means of the air entering the pipe 27. This is in the form of a hot air blast and is of sufficient pressure to retain the ring 39 in air-tight relation with the ring 36. In order that the air blast entering the branch 27 may not balloon the boot out and tend to destroy the air-tight joint between the two rings, there is provided a plurality of spring fingers 40 secured to the ring 37 exteriorly of the boot and tending to retain the boot in the position shown in Figure 5.

I find the above arrangement very effective as an air seal, but if desired the non-flexible one shown in Figure 6 may be utilized in its place. In this arrangement, a hollow journal 41 is secured to the end of the branch pipe 27 and is of a diameter to fit within the outer end of the hollow shaft 24. The fit between the parts 41 and 24 is sufficiently close to prevent escape of air or steam through the joint.

With the flap valve 15 in the position shown in Figure 2, the cotton after it passes through the separator 13 is shunted to the first conveyor of the top tier 20 of the battery and passes through a circuitous path during which the cotton is thoroughly dried to a point where substantially all of the moisture has been extracted therefrom. As it travels through the last two conveyors it is then subjected to the steam-laden air which sufficiently conditions the cotton for the ginning operation. The cotton then passes to the conveyor 17 which distributes it to any desired number of gins.

Figure 7:
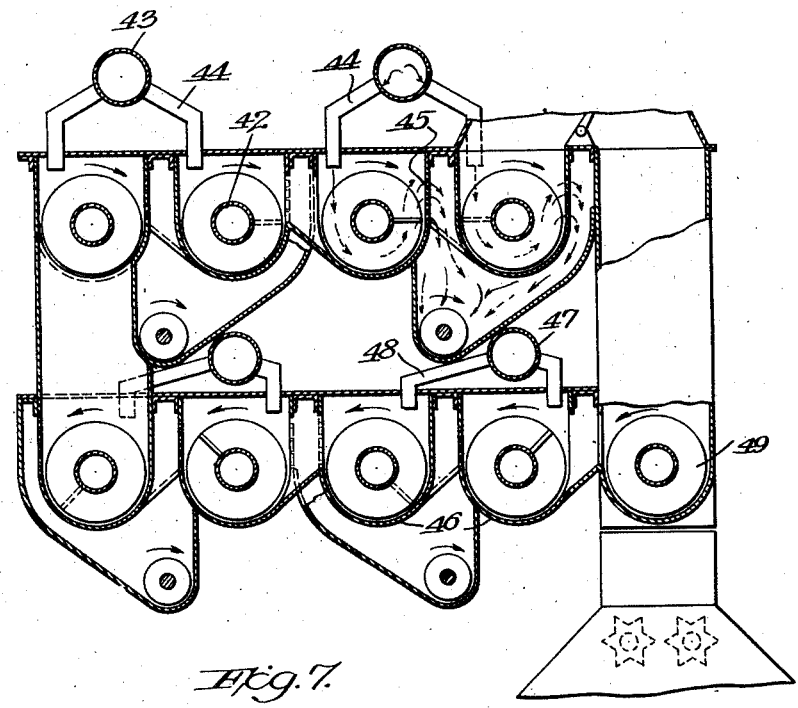
Figure 7 is a vertical transverse sectional view of a modified form of the battery of conveyors.

In Figure 7 I have shown a modified form of the invention wherein the heating and conditioning air is supplied through the tops of the troughs instead of through the screw shafts. In this form the screw shafts 42 may be either solid or hollow, as shown, and imperforate throughout their lengths. The heated air is distributed to branch pipes 43 which extend above and longitudinally of the troughs. In the present instance, each pipe 43 is designed to supply two troughs, and is provided throughout its length with a plurality of discharge nozzles 44. It will be observed that each nozzle 44 is positioned on the carrying side of the screw and that the perforations 45 in the sides of the troughs are located remote from or upon the opposite sides of the troughs. This arrangement is to permit the hot air to impinge down upon the compacted cotton and to thoroughly contact therewith before it escapes through the perforations 45. In a similar manner the moistened or steam-ladened air is delivered to the last two troughs 46 through a longitudinally extending pipe 47. This pipe has discharge branches or nozzles 48 which direct the moistened air downwardly upon the cotton so that it is adequately conditioned before it is transferred to the distributing conveyor 49.

As the cotton is conveyed through the battery of screws a certain amount of accumulated dirt and trash is shaken loose from the cotton and in order to take care of this loose material I have provided a plurality of troughs 50 into which this loosened material may be discharged. In the present instance, each trough 50 is designed to take care of the dirt and trash discharging from two conveyors. Each trough 50 is positioned below its set of conveyors so that the trash may be discharged through the perforations 31 and 45, respectively, into the bottom of the trough 50 where it is conveyed by a suitable screw 51 to a discharge pipe 52.

Both the hot and steam-ladened air, after it has functioned to dry and condition the cotton, also discharges through the perforations 31 and 45 into the troughs 50 and escapes through the pipes 52. With this arrangement, it will be apparent that the escaping air will assist in conveying the dirt and trash from the troughs 22 to the discharge pipes 52. It is to be understood, however, that the perforations 31 and 45, while sufficiently large to permit the escape of the trash and air, are small enough to prevent loss of any of the cotton. It is furthermore apparent that while I have shown four trash conveyors 50, this arrangement may be changed and if found desirable the trash and air from both tiers may be discharged into two conveyors positioned below the lowermost tier.

I claim:

1. In a cotton drier and conditioner, a battery of connected screw conveyors for moving the cotton in a circuitous path, each screw provided with a flipper arm at one end for transferring the cotton to the next adjacent screw, each screw having a hollow perforated shaft with the perforations extending to that end of the screw to which the flipper arm is secured but terminating short of the other end, and means for passing a conditioning fluid through said shafts for conditioning the cotton and assisting in its transfer from one conveyor to the other.

2. In a cotton drier and conditioner, a battery of connected screw conveyors for moving the cotton in a circuitous path, each screw provided with a flipper arm at one end for transferring the cotton to the next adjacent screw, each screw having a hollow perforated shaft with the perforations extending spirally of the shaft between adjacent turns of the screw, the perforations terminating short of one end of the screw but extending in a substantially straight line adjacent the flipper arm at the other end, and means for passing a conditioning fluid through said shafts for conditioning the cotton and assisting in its transfer from one conveyor to the other.

3. In a cotton drier and conditioner, a battery of connected screw conveyors positioned side by side in a substantially horizontal plane with adjacent screws rotatable in opposite directions for moving the cotton in a circuitous path, each screw provided with a flipper arm at one end for transferring the cotton to the next adjacent screw, each screw having a hollow perforated shaft with the perforations extending spirally of the shaft between adjacent turns of the screw, the perforations terminating short of the receiving end of the screw but extending in a substantially straight line parallel to the flipper arm at the other end, and means for passing a conditioning fluid through said shafts for conditioning the cotton and assisting in its transfer from one conveyor to the other.

4. In a cotton drier and conditioner, a screw conveyor having a hollow shaft closed at one end, means for supplying fluid to said shaft including a supply pipe in substantial alignment with the open end of said shaft, a flexible coupling boot secured to said pipe and overlapping the end of the shaft, a ring secured to said shaft and a second ring secured to said boot and adapted to be retained in fluid-tight contact with said first ring by the pressure of the fluid passing through the pipe.

5. In a cotton drier and conditioner, a screw conveyor having a hollow shaft closed at one end, means for supplying fluid to said shaft including a supply pipe in substantial alignment with the open end of said shaft, a flexible coupling member secured to said pipe, and having its free end encompassing the open end of the shaft, and maintained in fluid-tight relation therewith by the fluid passing through the pipe and shaft.

6. In a cotton drier and conditioner, a screw conveyor having a hollow shaft closed at one end, means for supplying fluid to said shaft including a supply pipe in substantial alignment with the open end of said shaft, a flexible coupling boot secured to the end of said pipe and encompassing the open end of the shaft, a ring secured to said shaft exteriorly thereof adjacent its open end, and a second ring secured to the free end of said boot and adapted to be retained in fluid-tight contact with said first ring by the pressure of the fluid passing through the pipe.

JESSE J. FOWLER.